(12) United States Patent
Tocher

(10) Patent No.: US 6,887,031 B1
(45) Date of Patent: May 3, 2005

(54) HABITAT FRIENDLY, PRESSURE CONVERSION, WIND ENERGY EXTRACTION

(76) Inventor: Angus J. Tocher, 115 Millview Ct. S.W., Calgary, Alberta (CA), T2Y 2W8

( * ) Notice: Subject to any disclaimer, the term of this patent is extended or adjusted under 35 U.S.C. 154(b) by 0 days.

(21) Appl. No.: 10/802,291

(22) Filed: Mar. 16, 2004

(51) Int. Cl.⁷ .................................................. F03D 1/04
(52) U.S. Cl. ............................... 415/1; 415/4.3; 415/4.5; 415/146; 416/10; 416/DIG. 6; 290/55
(58) Field of Search ............................ 415/2.1, 4.3, 4.5, 415/1, 3.1, 146, 908, 906; 416/10, 11, DIG. 6; 290/43–44, 54–55

(56) References Cited

U.S. PATENT DOCUMENTS

| | | | |
|---|---|---|---|
| 3,339,078 A | * 8/1967 | Crompton | 415/4.5 |
| 3,883,750 A | * 5/1975 | Uzzell, Jr. | 415/4.5 |
| 4,021,135 A | * 5/1977 | Pedersen et al. | 415/908 |
| 4,075,500 A | 2/1978 | Oman et al. | |
| 4,079,264 A | * 3/1978 | Cohen | 415/2.1 |
| 4,140,433 A | 2/1979 | Eckel | |
| 4,166,596 A | 9/1979 | Mouton, Jr. et al. | |
| 4,204,799 A | 5/1980 | de Geus | |
| 4,320,304 A | * 3/1982 | Karlsson et al. | 415/908 |
| 4,452,046 A | * 6/1984 | Valentin | 290/55 |
| 4,565,929 A | 1/1986 | Baskin et al. | |
| 4,715,782 A | 12/1987 | Shimmel | |
| 5,354,175 A | 10/1994 | Coleman et al. | |
| 5,464,320 A | 11/1995 | Finney | |
| 5,599,172 A | 2/1997 | McCabe | |
| 6,265,785 B1 | 7/2001 | Cousineau et al. | |
| 6,623,243 B1 | 9/2003 | Hodos | |

FOREIGN PATENT DOCUMENTS

| | | | |
|---|---|---|---|
| EP | 1359320 A1 | 11/2003 | |
| GB | 695519 A | * 8/1953 | 415/4.3 |

OTHER PUBLICATIONS

Latcovich, J., "The Locomotive The Full Story: The Changing Face of Wind Power," Internet article pp. 1–6 (Feb. 2004).

Grassmann et al., *Renewable Energy*, "A partially static turbine—first experimental results," *In Press*, pp. 1–7 (2003).

* cited by examiner

*Primary Examiner*—Christopher Verdier

(57) ABSTRACT

A habitat friendly, pressure conversion, wind energy extraction system is disclosed for safely extracting usable energy from wind. The system includes one or more shrouds or concentrator wings that convert the dynamic pressure of wind into relatively lower static pressure and thereby induces a vacuum that draws wind into a turbine centralized within the shrouds or concentrator wings. As such, the turbine impellor blades may be significantly smaller than the large diameter rotor blades of current popular designs and may be enclosed within the shrouds or concentrator wings that present themselves as highly visible objects and as such are easily avoided by birds in flight. The novel system in particular includes a device and method of airflow regulation than minimizes or prevents the stalling, or the generation of a turbulent flow of wind over or between the shrouds or concentrator wings. This stalling has been shown to occur when airflow is quickly accelerated by force of vacuum and drawn out of the turbine shroud which then mixes with and disturbs the otherwise smooth flow of wind over or between the shrouds or concentrator wings. The system may also include an aerobrake that responds quickly to protect the impellor blades or associated mechanisms from overspeeding or exceeding other design limitations under gusting or violent wind conditions. The system may also include a method of guiding elements of the system to orient appropriately into prevailing winds, and a method to support elements of the system, without unduly impeding the free flow of wind. Other advantages and objects are as well disclosed that increase safety and efficiency, increase installation potential, reduce costs and expenses, and minimize negative environmental impact.

18 Claims, 5 Drawing Sheets

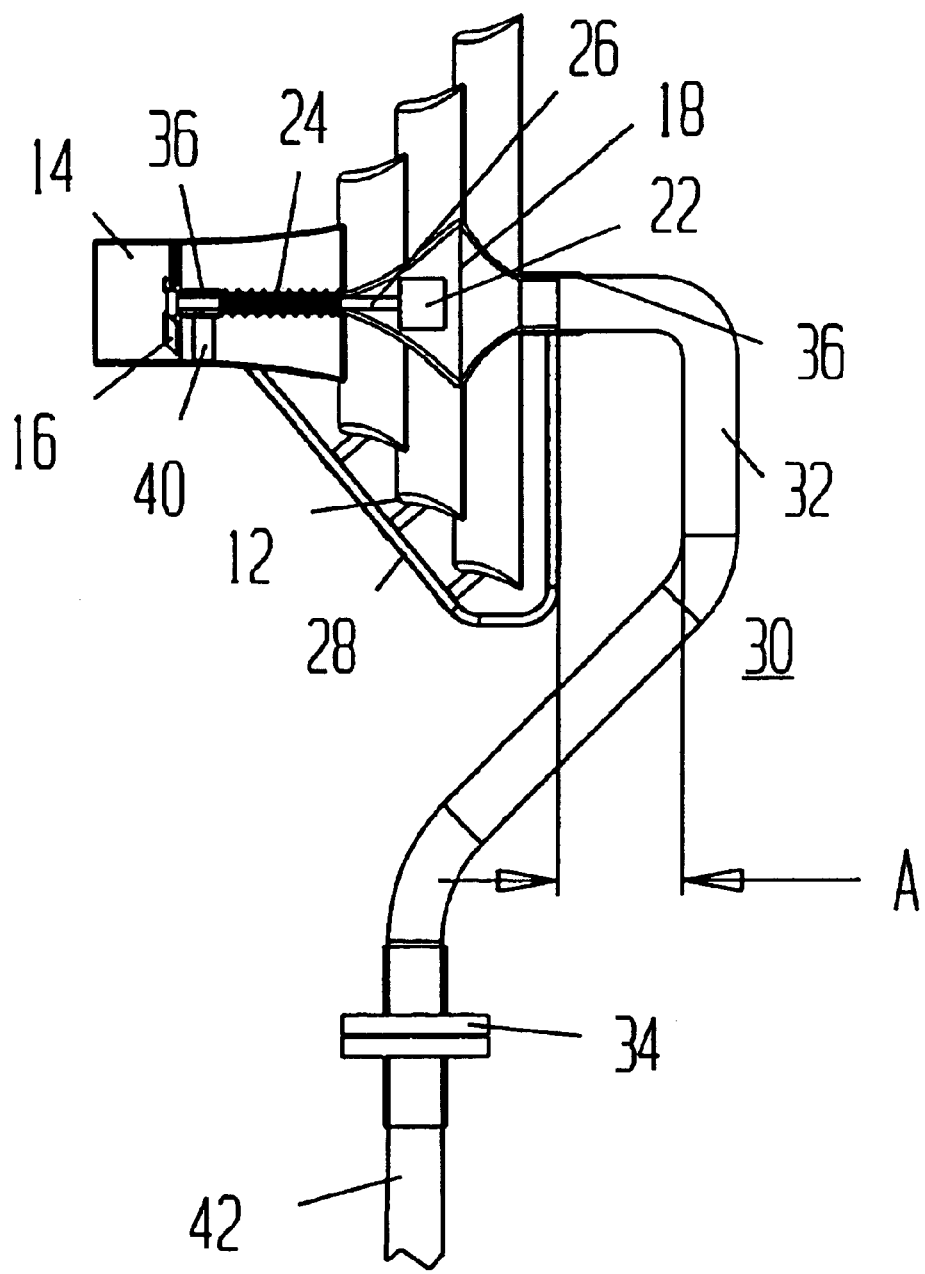

US 6,887,031 B1

HABITAT FRIENDLY, PRESSURE CONVERSION, WIND ENERGY EXTRACTION

FIELD OF THE INVENTION

The present invention relates to using wind energy and in particular, to safely and efficiently extracting energy from the wind and converting it to usable energy.

BACKGROUND OF THE INVENTION

The demand for alternative or renewable energy sources has dramatically increased during the last decade of the $20^{th}$ century and continues in the new millennium. This demand is driven by the awareness of the depletion of the earth's non-renewable carbon based sources of energy of oil, gas and coal, and by the apparent effects of carbon waste emissions in particular, carbon dioxide and sulfur and nitrate emissions, adding to global warming and pollution of the planet's renewable air and water biosphere. The conversion of wind energy to usable electrical energy is generally considered to be the most promising source of renewable energy for the $21^{st}$ century. This is evidenced by an increase of nearly seven fold of the power production through wind power from around 2000 megawatts in 1990, to more than 13,400 megawatts at the end of 1999.

Ideally, the conversion of wind energy to usable electrical energy wold be pollution free and have a zero negative impact on the earth's environment. In practice however, the use of popular wind turbines having rotor blades as long as 80 meters or longer and having tip speeds exceeding 100 mph introduce serious environmental hazards including visual and noise pollution and, perhaps of most immediate public concern, bird strikes. Bird mortality is a fact that proponents of modern wind turbines do not like to advertise and it is difficult to obtain bird mortality statistics. Dealers of wind equipment do however caution the use of such equipment within known or potential bird migratory routes, or within locations where threatened or endangered bird species live and nest. Rotor blade driven wind turbines pose a particular hazard to raptors, or birds of prey, many species of which are classified as endangered. The hazard is amplified by the fact that wind farm sites are generally chosen or maintained clear of trees and bushes, and are often populated by small rodents or rabbits, prey of raptors or hunting birds. The observed behavior of these birds is to focus so intently on the object of prey that they do not become aware of the hazard and are often struck and killed by the high speed rotor blades. It is not practical or cost effective to attempt to fence out or otherwise exclude prey of these birds from wind farm sites. It is clear that a more wildlife and habitat friendly wind energy conversion device is demanded. HSB Insurance Company, a major specialty insurer, published a February, 2004 article in "The Locomotive" entitled "The Changing Face of Wind Power". This article provides a brief summary of safety issues relating to environmental protection and in particular to aviary safety. U.S. Pat. No. 6,623,243 entitled "Minimization of Motion Smear, an Approach to Reducing Avian Collisions with Wind Turbines" to Hodos, (2003) emphasizes the need to address the serious problem of bird strikes by modern high speed wind turbine rotor blades. Hodos' work introduces the use of highly contrasting patterns in an attempt to reduce the 'motion smear', or motion blur that causes the rotor blades to appear nearly invisible to birds in flight which approach wind turbines or wind farms having wind turbines of this type. Of the large number of wind turbine designs that have been produced especially over the last 40 years, the shrouded turbine is the only design that has the potential both to save birds harmless and provide the wind energy conversion efficiency and cost efficiency demanded of the application. Shrouded turbines generally allow the use of smaller and more enclosed rotor blades or impellors, and have physical shrouds or ring shaped concentrator wings that are highly visible to birds in flight but at the same time do not present moving objects, such as large rotating blades that are considered by many to visually mar the natural landscape. Of the shrouded wind turbines, versions having two or more concentrator wings that allow the wind to flow between the concentrator wings and develop a vacuum or suction that drives the turbine, have demonstrated, in recent times, to be the most promising and efficient devices. A main object of the present invention is to make improvements to wind energy conversion devices of this type, such that these devices have greater conversion efficiency, and are made more practical and cost efficient.

Several wind energy conversion devices of note employ shrouds or concentrator wings to accelerate the flow of wind through the turbine that converts energy usually to usable electrical energy. U.S. Pat. No. 5,599,172 entitled "Wind Energy Conversion System" to McCabe (1997) provides an example of a single shroud surrounding the turbine rotor blades and includes a description of the shroud acting as a venturi. The venturi is a commonly understood device used to develop a drop in static fluid pressure, air in this case considered to be the fluid, and thereby increase the flow velocity in the restriction or neck of the venturi. U.S. Pat. No. 4,075,500 entitled "Variable Stator, Diffuser Augmented Wind Turbine Electrical Generation System" to Oman, et al. (1978) provides an additional example of a turbine that includes a surrounding shroud having unique perforations that are alleged to "energize the boundary layer along the wall of the diffuser", acknowledging the importance of maintaining an attached or laminar flow of air through the aft end of the diffuser or shroud. Also of note in this citation is the streamlined or "faired" body used to house the generator and associated mechanisms. This is a non-trivial design when it becomes necessary to insert the generator components within the high speed airflow of the turbine shroud or housing. Any non-essential drag in this area will directly subtract from the wind energy available for conversion. This cited application was assigned to the Grumman Aerospace Corporation which, one can assume at least, gave serious consideration to this invention. U.S. Pat. No. 4,140,433 entitled "Wind Turbine" to Eckel (1979) provides a further example of a venturi type, or shrouded turbine having components similar to those of modern turbojet aircraft engines. The wind turbine however is a passive device that must allow, rather than resist, the flow of wind through the turbine. In the present age it is a simple matter to determine, using computer airflow simulation, that the flow of wind, similar to the flow of electricity, will seek the path of least resistance. By definition, a venturi includes a restricted or narrowed passage that is presented as an obstacle to the flow of wind causing a dynamic pressure gradient extending well upstream of the wind turbine that uses a venturi of this type. This in turn causes a large proportion of the wind simply to divert around the turbine to rejoin well downstream or downwind of the device. This natural phenomena is appreciated in wind turbines using multiple concentrator wings having spacings between the concentrator wings that allow the wind to flow freely through and past the concentrator wings and, exactly as does an aircraft wing, develop a field of low static pressure that is used to create lift for aircraft, and suction or vacuum for wind turbines having multiple flow-through shrouds or concentrator wings. The use of flow-through shrouds or diffusers has been practiced for many years. A bi-wing or tri-wing aircraft uses similar principles to develop high lift from relatively low air speeds. U.S. Pat. No. 4,166,596 entitled "Airship Power Turbine" to Mouton, Jr., et al. (1979) deserves citation as such an example. In this example, the outer shroud or concentrator wing is referred to as the 'vena contracta', and includes a description of its function to induce a vacuum or low static pressure. The entire proposed structure is helium filled and designed to operate at higher altitudes in higher velocity winds. Whether or not practical, the aesthetic quality is uplifting. Aesthetics are important and in fact a distinct public criticism of wind farms in general is the visual marring of the natural landscape. The very rotational motion of large wind turbine rotor blades is perceived by many to distract and detract from the visual enjoyment of natural landscapes.

Further examples of wind turbines that use multiple shrouds or concentrator wings include:

U.S. Pat. No. 4,204,799 entitled "Horizontal Wind Powered Reaction Turbine Electrical Generator" to deGeus (1980);

U.S. Pat. No. 5,464,320 entitled "Superventuri Power Source" to Finney (1995);

An European Patent application No. EP1359320A1 entitled "Shrouded Fluid Flow Turbine" to Grassmann (published 2003).

In one embodiment the device of the present invention includes an aerobraking system that is reliable and potentially less costly than mechanical or aerodynamic braking systems of other rotor driven wind turbine systems. U.S. Pat. No. 4,565,929 entitled "Wind Powered System for Generating Electricity' to Baskin, et al. (1986) describes a mechanical braking system that reacts to an increase in centrifugal force as the turbine rotor blades accelerate to trigger the deployment of aerodynamic drag producing devices affixed to the rotor blades that in turn slow the rotation of the blades. U.S. Pat. No. 4,715,782 entitled "Hydraulic Control Device for Wind Turbine" to Shimmel (1987) describes a similar operation but using hydraulics to deploy the aerobrake devices. U.S. Pat. No. 5,354,175 entitled "Wind Turbine Rotor Hub and Teeter Joint" to Coleman, et al. (1994) is another example of a mechanical braking scheme that allows the rotor blades to deflect backwards and in the direction of the wind flow under gusting or overwind conditions. This is similar to varying rotor blade pitch or angle of incidence but is perhaps faster to respond to gusting wind conditions. U.S. Pat. No. 6,265,785 entitled "Non-volatile Over Speed control System for Wind Turbines" to Cousineau, et al. (2001) is an example of a modern combined mechanical and aerodynamic system that uses a sophisticated mechanical, electrical and hydraulic system to prevent turbine overspeeding, and uses fail-safe systems to be initiated in the event of a power outage or failure of the hydraulics of the braking system. This latter example emphasizes the importance of reliable braking and back-up braking systems not only to prevent damage or destruction to the wind turbine and other wind turbines when within a wind farm, but as well to protect the public in the event of a catastrophic mechanical failure.

All of these devices add significant costs and many add considerable weight to the high speed rotor blades. Adding aerodynamic wing tip brakes and associated hardware to precisely toleranced and balanced rotor blades increases design, manufacturing and maintenance costs. As well, the added weight increases the demands made on the braking system itself and adds to the hazard should a component failure occur. To the point that it is effective, simple is surely better in the design of braking systems for wind turbines. The smaller turbines allowed by shrouded designs generally run at higher rpm's but can develop tremendous power depending on the size and number of concentrator wings used. Braking therefore is also an important consideration for shrouded wind turbines.

In recent years, significant research and experimentation has been undertaken at the University of Udine, Italy. An article prepared by a group of the University of Udine published in the journal of Renewable Energy (February, 2003) by Dr. H. Grassmann et al., is entitled "A Partially Static Turbine—first experimental results". This article describes a prototype wind turbine having two shrouds or concentrator wings that allow a flow of air between the shrouds to develop an area of lower static pressure downwind of the turbine. An identical but unshrouded wind turbine is used for comparison. The article states that an increase of 100% of the power of the turbine was achieved in low wind velocities and 55% in high wind velocities. The lower percentage increase in power performance at high wind velocities (presumably 8 meters per second, or about 18 mph) is attributed, in the article, to turbulence generated by non-optimal impellor or rotor design. In the "Measurements" section the article states, "The simulation shows that consequently a large vortex behind the turbine is created. When one adds the shroud, this vortex strongly increases. As a result the shroud augments the power of the turbine by only 20% with these blades." The article concludes at the end of this paragraph, "We strongly conclude at this point, that the quality of the propeller blades is very important for the performance of the shrouded turbine." In the "Conclusion" section at the end of the article this is reinforced, "The quality of the propeller is decisive for the performance of such a system. A dedicated program of optimization is needed for the propeller." The experimental results described in this article, for higher wind speed winds (although 18 mph is generally not considered high speed for wind turbines) show that as the vortex, or turbulence downstream of the wind turbine, increases with increasing wind speeds, the performance of the shrouded turbine markedly decreases. While it is given that the impellor blades produce a downstream turbulence it is not agreed that this turbulence is the cause of the "large vortex behind the turbine". The research of the applicant has demonstrated that the generation of the turbulent vortex is more fundamental and would occur even if the impellor blades were to present at all. The powerful stream of air that is drawn by suction through the smallest diameter shrouds forces directly downstream and interferes with the flow of wind over and between the concentrator wings that are attempting to flow the wind outwards, away from the central axis. These are contrary forces, and in higher wind conditions, as the article indicates, the stronger force wins with the resultant formation of a large turbulent vortex, the aerodynamic stalling of the concentrator wings, and the loss of power. The phenomenon is analogous to a blow torch that blows itself out when too much gas pressure is applied. It is therefore a significant object of the present invention to introduce a flow regulator element installed in the downstream flow of air that is drawn through the turbine or smallest diameter shrouds so as to stabilize either the force of air flowing out of the turbine or smallest diameter shrouds or flowing through the impellor blades of the device. In so doing, it is unnecessary to optimize the impellor blades, certainly a futile attempt at least for higher speed winds. An additional use of the flow regulator element is as part of an aerobraking system that serves to respond quickly to wind gusts and control or restrict the flow of wind through the impellor and thereby protect the turbine from overspeeding in gusting or overly high wind conditions.

SUMMARY OF THE INVENTION

The foregoing describes a system and method for safely and efficiently extracting energy from wind and converting it to usable energy comprising one or more concentrator wings that react with the flow of wind to induce a drop in static air pressure that is then used to drive an impellor and power converter; and a flow regulator means having aerodynamic surfaces that direct the flow of wind entering a turbine shroud and impinging upon said flow regulator means outwards from a central axis running approximately parallel with the direction of said wind entering said turbine shroud and concentric with said concentrator wings, and additionally one or more of the following:

an aerobrake means such that the proximity of said turbine shroud to said flow regulator means is adjusted such that during overly high velocity wind conditions said proximity will be reduced so as to impede or restrict the flow of wind through said turbine shroud; wherein said power converter is installed on the downwind side of said aerodynamic surfaces of said flow regulator means; and further comprising an impellor driveshaft connecting said impellor to said power converter, said impellor driveshaft extending out of said flow regulator means and positioning said impellor within the flow of wind passing through said turbine shroud; a downwind guidance means for supporting elements of the invention, said downwind guidance means presenting little obstruction to the higher speed wind flow upstream of said elements of said invention, said downwind guidance means facilitating the orientation of said elements of said invention approximately into the oncoming wind and said downwind guidance means comprising a lee support means that supports said elements of said invention and extends in a downwind direction then turns outward from said central axis and connects with a swivel means that allows said elements of said invention to rotate around a common axis and effect said orientation.

Further objects and advantages of the present invention will become apparent from consideration of the following description and accompanying drawings.

Accordingly, it is the object of the present invention to provide a wind energy extraction device and method that includes one or more of the following objects and advantages:

1. To provide a flow regulation device or method to increase the wind energy extraction efficiency of a wind turbine having one or more shrouds or concentrator wings especially in conditions of higher wind speeds.
2. To provide a simple, cost effective and fast-responding aerobraking device or method to protect the wind turbine's impellor or associated components from overspeeding or exceeding other design limitations during gusty or high wind conditions.
3. To provide an impellor driveshaft that extends from the flow regulator in order to house the power converter within the flow regulator in order to reduce or eliminate the obstruction of an open or faired power converter that occurs when it is positioned within a high speed wind flow within a turbine shroud or concentrator wing.
4. To provide a simple and cost effective downwind guidance device or method to permit the present invention to orient appropriately into the oncoming wind such that the guidance system is presented downstream of the concentrator wings and impellor to increase wind energy extraction efficiency.
5. To provide a system that is safe to humans and wildlife and particular to birds in flight.
6. To provide a system that generates a low degree of vibration and noise to be more suitable for installation within both rural and urban environments and attached to man-made buildings and structures.
7. To provide a system that is able to extract energy from higher speed winds and that has a higher shut-down wind speed limit that shroud-less wind turbines of popular designs.
8. To provide a wind energy extraction system that has overall reduced design, production and maintenance costs and expenses.

BRIEF DESCRIPTION OF THE DRAWINGS

FIG. 2 is a cross-sectional view of the invention indicating a non-aerobraked position of the concentrator wings, turbine shroud and associated components.

DETAILED DESCRIPTION

Figure 1A:
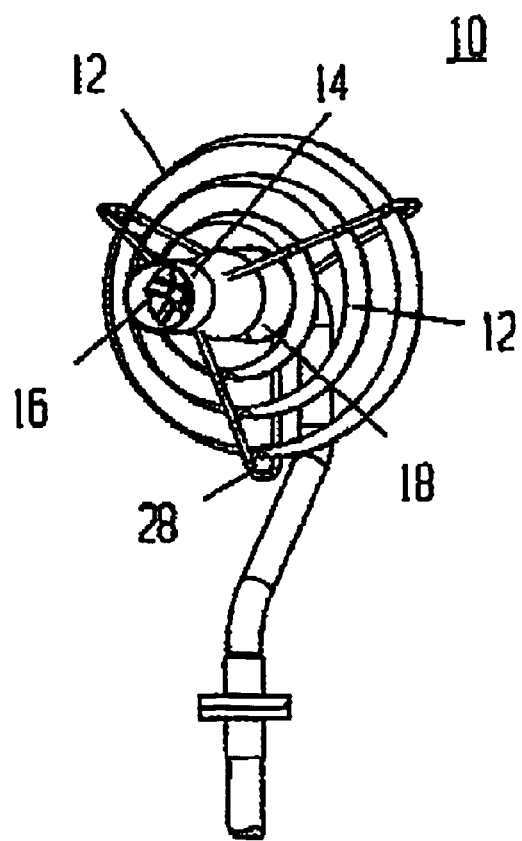
FIG. 1A provides, on the left side of the page, a perspective view of the invention, and FIG. 1B provides, on the right side of the page, a cross-sectional view of the same revealing additional internal components.
Figure 1B:
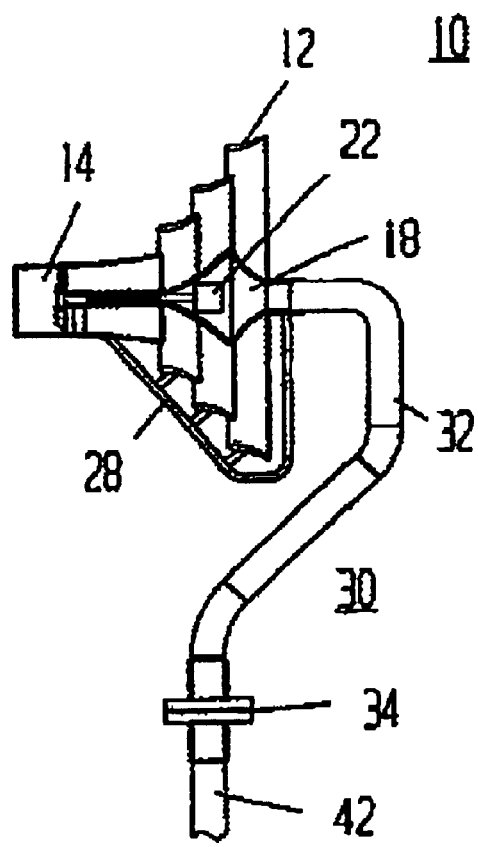
Figure 6:
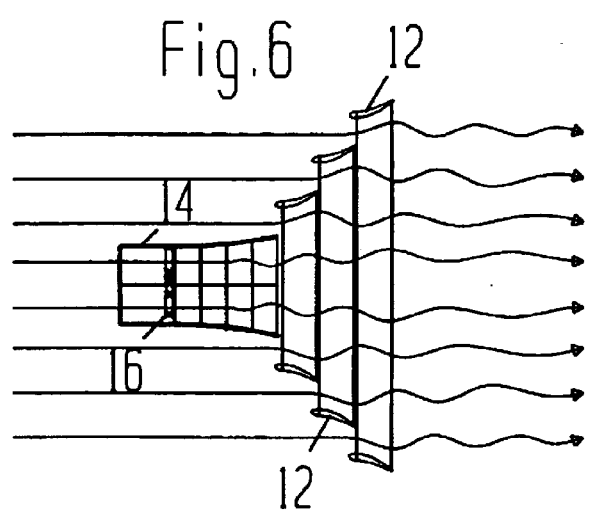
FIG. 6 is a schematic cross-sectional view of same, but without the aerobrake indicated so as to illustrate turbulence generated by the unregulated flow of wind out of the turbine shroud.

The description of invention 10 as presented in FIG. 1A and FIG. 1B must begin with a description of how shrouded wind turbines having one or more concentrator wings 12 operate. FIG. 6 therefore illustrates schematically, a cross section of the flow of wind through turbine shroud 14 and through three additional shrouds or concentrator wings 12. Turbine shroud 14 serves to enclose impellor 16 which in turn serves to react with the wind flowing through turbine shroud 14 and drive power converter 22, not shown in this illustration, such as an alternator or generator. Concentrator wings 12 operate fundamentally the same as aircraft wings and have similar profiles as may be readily seen from FIG. 6. These profiles generally have a top convex shaped surface to accelerate the flow of wind, and a lower flattened or concaved surface that tends to slightly decelerate the flow of wind past three surfaces. The profiles of concentrator wings 12 as illustrated are inclined, or have, in aeronautical terms, an angle of incidence that cause the wind flow to be deflected outwards from a central axis that runs parallel with the wind flow and concentric with concentrator wings 12 and turbine shroud 14. The obvious difference between concentrator wings 12 and wings of an aircraft is that concentrator wings 12 are generally, but not necessarily, ring shaped.

Those skilled in the art of aeronautics will readily appreciate the interactions that occur when two or more aircraft wings are staged one above the other as in, for example, the Stearman biplane that continues to serve as a high load lifting agricultural spray aircraft, and the highly maneuverable Sopwith triplane of World War I service. Essentially, the lower wing, in the biplane or triplane example, comparable to the largest diameter concentrator wing 12 in the example of invention 10, induces a lower static pressure region over the top surface of the wing that in turn causes an acceleration of the wind flow past the lower surface of the above wing, comparable to the second largest diameter concentrator wing 12 in the example of invention 10. This in turn causes an increased acceleration of the flow of wind over the top surface of this wing. This configuration of multiple aircraft wings is used generally where higher lift and lower stall speeds are desired when it is necessary to limit the overall span of the wings to increase maneuverability of the aircraft. In the present invention, this effect is used to increase the static pressure differential occurring between the inlet of wind to turbine shroud 14 and the outlet. Another way of understanding the interaction of concentrator wings 12 in invention 10 is to appreciate that the largest concentrator wing 12 will induce a lower static air pressure field above its top surface and this field of lower static pressure will be further concentrated by the next largest concentrator wing 12 and so on until at the area where the airflow exists turbine shroud 14, this field is most highly concentrated. It is the static pressure gradient therefore between the inlet of turbine shroud 14 and the outlet of same that causes the wind to be drawn powerfully through turbine shroud 14 and drive impellor 16 and power converter 22. This draw can in fact be so powerful, especially in higher winds, that the flow of wind outwards from turbine shroud 14 can disturb the smooth or laminar flow of wind over and between concentrator wings 12. This occurrence is illustrated in FIG. 6 by the wavy appearance of the arrows indicating a disturbed wind flow over and between concentrator wings 12. This phenomenon has been verified both experimentally and through computer simulation using modern fluid flow computer software. As the wind flow increases in velocity, the stream or jet of wind exiting turbine shroud 14 multiplies in velocity and a point is reached where the smooth flow of wind over and between concentrator wings 12 suddenly becomes turbulent. When this occurs, the low pressure fields generated by concentrator wings 12 break down and little additional power becomes available. In aeronautical terms this is called wing stalling. This occurs when the smooth flow of wind over the top surface of a wing suddenly separates further upwind and becomes turbulent. This may occur where the wing is subjected to too great an 'angle of attack' to the oncoming wind under low airspeeds or when the wing loading is increased such as during a steep banking turn. At such point, a dramatic loss of lift occurs from which the pilot must recover. In the Renewable Energy article cited in the Background of Invention section of this application, this effect is also confirmed but the conclusion is made, but not confirmed, that an improved impellor design would serve to eliminate this problem. A major objective of the present invention is to provide a solution to this shortcoming of the prior art that is not dependant on any improved impellor design and is able to accommodate higher wind speeds without the stalling of concentrator wings 12 as continues to occur in the prior art.

Figure 4:
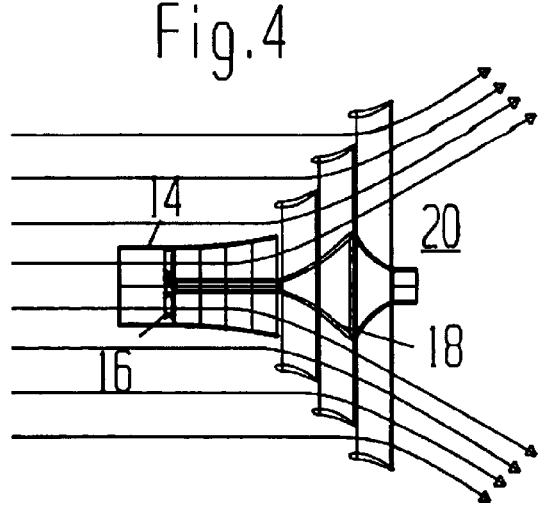
FIG. 4 is a schematic cross-sectional view of the windflow, indicated by arrows, interacting with the invention in a non-aerobraked condition.

FIG. 4 schematically illustrates a cross section of the more laminar flow of wind over and between concentrator wings 12 when the device of the present invention includes flow regulator 18. Flow regulator 18 is a component having aerodynamic surfaces that cause the stream of wind that is drawn into turbine shroud 14 to be directed outwards and away from a central axis running approximately parallel with the oncoming wind and through the centers of concentrator wings 12. This re-direction of the jet of wind exiting turbine shroud 14 maintains or promotes a smooth flow of wind over the top surfaces of concentrator wings 12 and thereby eliminates or reduces the aerodynamic stalling of concentrator wings 12 that would otherwise occur. As first glance, the introduction of such a device as flow regulator 18 may appear to impede the flow of air out of turbine shroud 14 and potentially reduce the available power of wind driving impellor 16. Experimentally however, the performance gained by maintaining a smooth flow of wind over concentrator wings 12 far outweigh the induced drag losses, when flow regulator 18 is positioned at a correct distance from turbine shroud 14 and within the high speed stream of air exiting same. As will be disclosed, this very property of inducing drag or restricting the wind flow exiting turbine shroud 14 may be used beneficially in invention 10 to provide aerodynamic braking in order to protect components of the present invention in conditions of gusting or very high speed winds.

Figure 5:
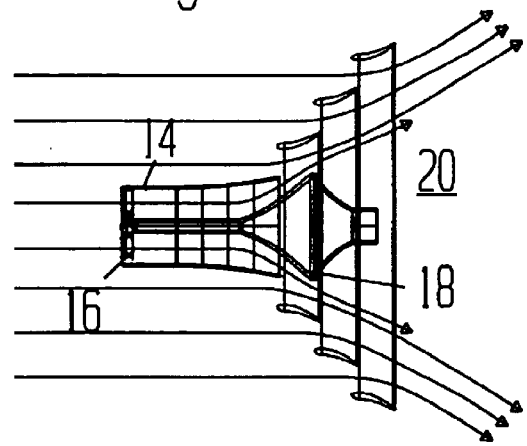
FIG. 5 is a schematic cross-sectional view of same, with the invention in an aerobraked condition.

FIG. 5 therefore also schematically illustrates a cross section of the flow of wind over and between concentrator wings 12, through turbine shroud 14 and over the aerodynamic surfaces of flow regulator 18. Of note in FIG. 5 relative to FIG. 4 is the closer proximity of flow regulator 18 to turbine shroud 14. This closer proximity restricts the flow of wind out of turbine shroud 14 thereby acting to aerodynamically brake impellor 16 in the event of overly gusting or very high speed winds. Aerobrake 20 therefore includes flow regulator 18 and turbine shroud 14 and an adjustment of the proximity between flow regulator 18 and turbine shroud 14 to prevent impellor 16 or other components of invention 10 from overspeeding or exceeding other design limitations in gusting or very high speed winds. For the definition of aerobrake 20 and for general understanding it must be noted that turbine shroud 14 as illustrated is hereby defined as a special case of concentrator wing 12 that in the case of turbine shroud 14 is used in association with impellor 16. A device having aerodynamic surfaces as described for concentrator wings 12 may as well be used as turbine shroud 14 and interact with flow regulator 18 to serve in the definition of aerobrake 20. An adjustment of the proximity of flow regulator 18 and turbine shroud 14 will now be described.

Figure 3:
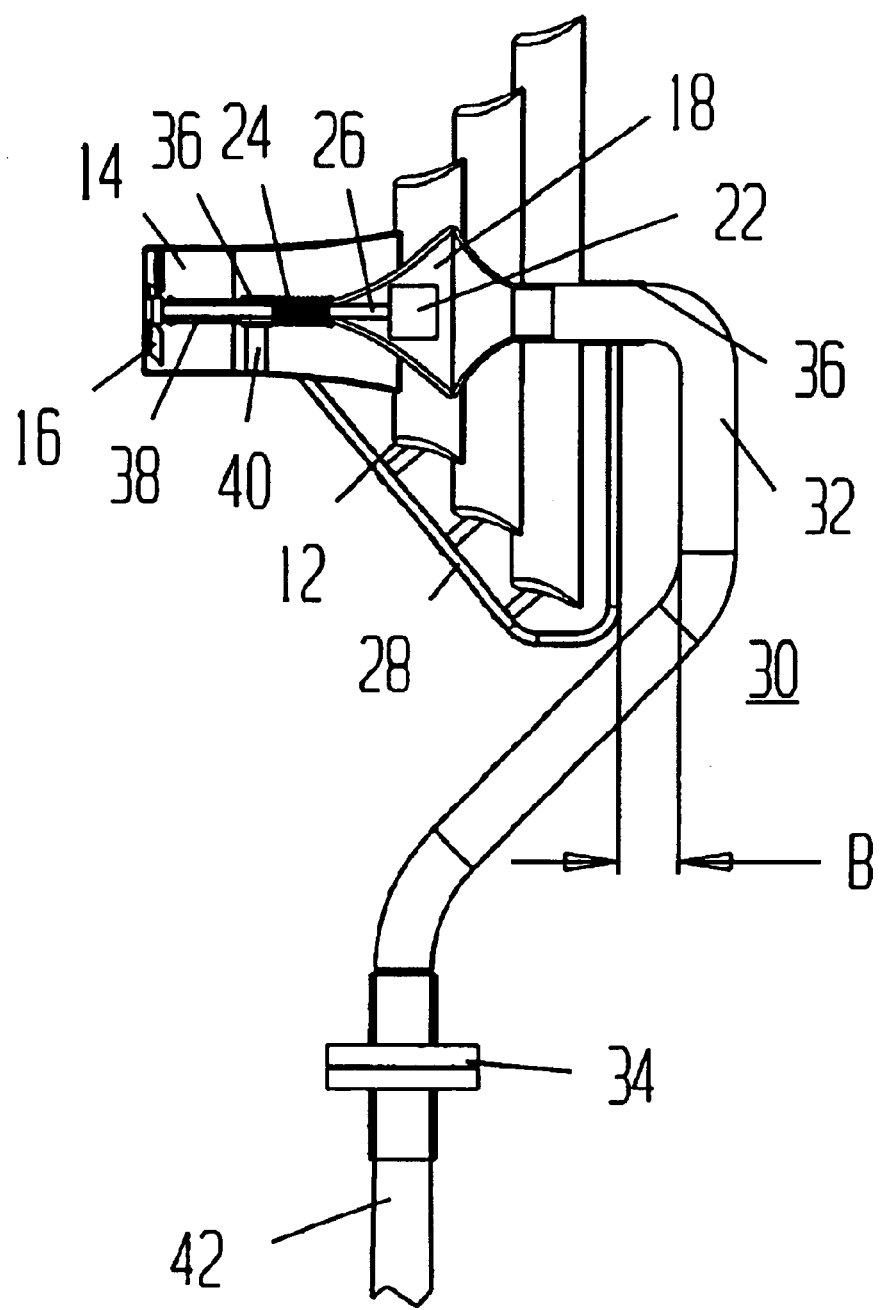
FIG. 3 is a cross-sectional view of the invention indicating an aero-braked position of the concentrator wings, turbine shroud and associated components.

FIG. 2 provides a cross-sectional view of elements of invention 10 and in particular illustrates an adjustment of the proximity of turbine shroud 14 to flow regulator 18. FIG. 2, like FIG. 4 illustrates components of invention 10 in a non-aerobraked condition where turbine shroud 14 is in a far position relative to flow regulator 18. For convenience, the length of the relative far position is indicated by the letter "A". FIG. 3 provides an identical view with the exception that components of invention 10 are not in an aerobraked position where turbine shroud 14 is in a close position relative to flow regulator 18. In this instance, the length of this relative close position is indicated by the latter "B". Aerobrake 20 allows concentrator wings 12 or turbine shroud 14 to be pushed by the force of a gusting or high speed wind upon these elements. Concentrator wings 12 and turbine housing 14 are connected together by retainers 28, one of which is illustrated in FIGS. 2 and 3. Retainer 28 then connects with collar 36 that is free to slide along lee support 32. Turbine shroud 14 is also connected to struts 40, one of which is illustrated in each of FIGS. 2 and 3, struts 40 then connecting to another collar 36 that is free to slide on driveshaft housing 38 visible in FIG. 3. Referring now to FIG. 2, in conditions where the wind is not overly gusting or overly high speed, invention 10 will maintain a non-aerobraked condition with one of collar 36 pressing against compression spring 24. FIG. 3 then represents an aerobraked position where the force of the gusting or overly high speed wind is pushing against concentrator wings 12 or turbine housing 14 or other elements and causing collar 36 to compress compression spring 24 and slide in a downwind direction towards flow regulator 18 thus closing the gap between the outlet of turbine shroud 14 and the aerodynamic surfaces of flow regulator 18. Also of note is the position of impellor 16 relative to the inlet of turbine shroud 14 in the non-aerobraked condition as illustrated by FIGS. 2 and 4, and the aerobraked condition as illustrated by FIGS. 3 and 5. For very high wind conditions, it may be advantageous to include a catch mechanism (not illustrated) operating such that when compression spring 24 is compressed to some defined limit, this catch will not allow compression spring 24 to de-compress, and invention 10 will remain in an aerobraked condition until the catch is released. This may serve to further protect the moving elements in severe weather conditions.

FIG. 3 illustrates impellor 16 attaching to impellor driveshaft 26 that passes through and is free to rotate within driveshaft housing 38. Impellor driveshaft 26 then enters flow regulator 18 that may also be used to house power converter 22, typically an alternator or generator, used to convert mechanical torque into usable electrical energy. It is an object of the present invention to remove power converter 22 from the high speed flow passing by impellor 16. The Background of Invention section of this application cites examples of wind turbines where the alternator or generator must be faired in to minimize aerodynamic drag losses incurred by the necessary placement of these elements within the high speed wind flow. Impellor driveshaft 26 of the present invention extends impellor 16 into the high speed flow of wind drawn through turbine shroud 14 and as well allows power converter 22 to be enclosed within flow regulator 18 and out of this high speed flow. Concentrator wings 12 and flow regulator 18 work in conjunction to direct the wind flow outwards away from the central axis as described and cause the formation of a 'dead' or slow moving airspace downstream of the aerodynamic surfaces of flow regulator 18. This dead airspace provides an ideal location for power converter 22 especially when housed within flow regulator 18 and protected from weather and other elements of the natural environment.

In theory, and in practice, the highest energy extraction efficiency occurs when the wind is decelerated immediately downstream of a wind turbine to about ⅓ of its original free flowing velocity. This principle as well applies to shrouded wind turbines. This principle is applied in invention 10 and it is an object of the invention to mount and support elements of invention 10 to present little obstruction to the higher speed wind flow upstream of components of invention 10, and, at once allow invention 10 to orient into the oncoming wind and preferably without the assistance of motor drives or ancillary wind direction sensing instruments. With reference again to FIG. 2, downwind guidance 30 serves as such. Downwind guidance 30 includes lee support 32, a mounting element that supports concentrator wings 12, flow regulator 18, and other elements of invention 10, and extends in a downwind direction into the slower moving wind flow on the leeward side of concentrator wings 12. Lee support 32 then turns outward from the previously described central axis of wind flow and finally connects with swivel 34 that is mounted just forward of the center of wind pressure upon concentrator wings 12 and other elements of invention 10 to allow these elements to rotate about swivel 34 and be directed or preferably self-orient appropriately into the oncoming wind. Swivel 34 best include sealed roller bearings that permit low friction rotation of swivel 34 and ensure a long operational life in an outdoor environment. Swivel 34 may also include a commutator plate (not illustrated) to conduct electrical power generated by power converter 22 through swivel 34 for further processing or utilization.

Figure 7A:
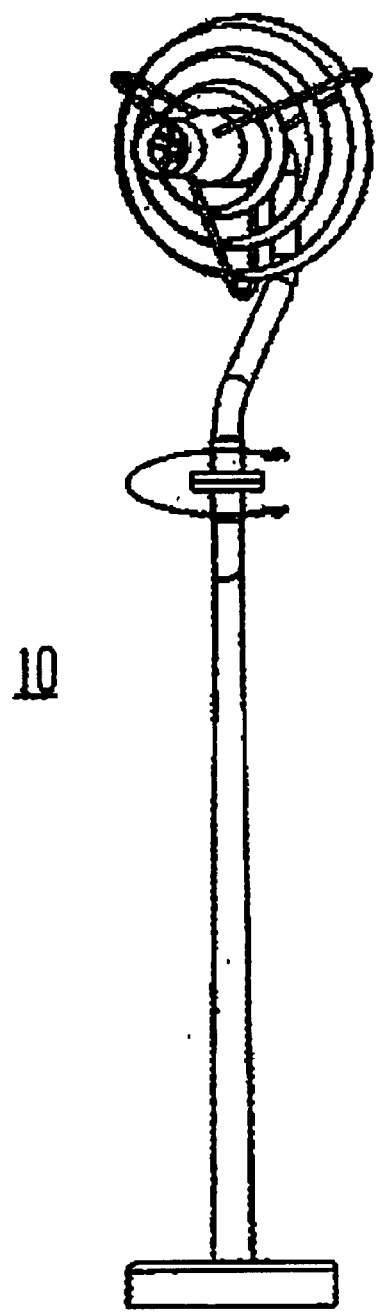
FIG. 7A and FIG. 7B are duplications of FIG. 1A and FIG. 1B respectively, but including riser and foundation components and indicating the swivel action of the downwind guidance system.
Figure 7B:
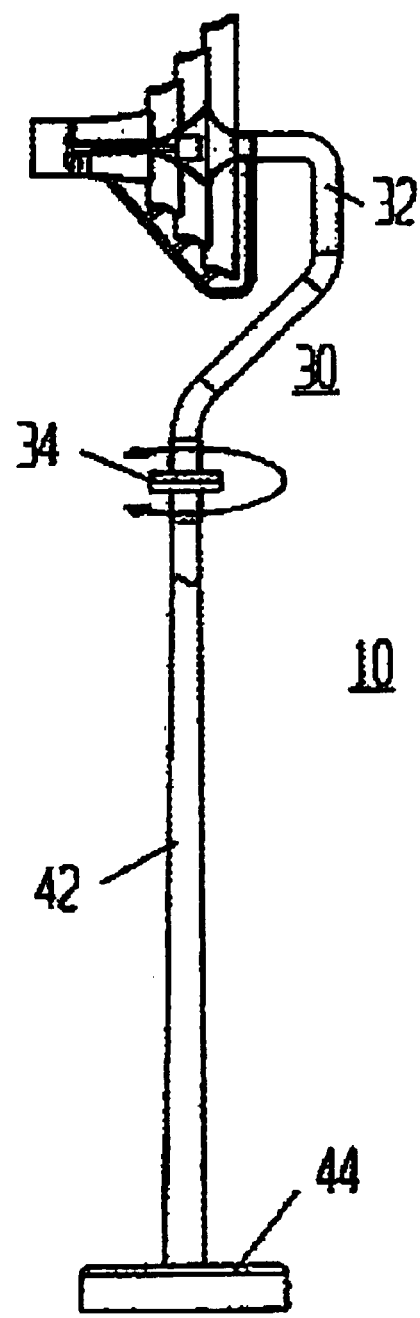

Referring now to FIG. 7A and FIG. 7B, care must also be taken to ensure that riser 42, which provides support to swivel 34 and as well extends elements of invention 10 into a freer unobstructed flow of wind, is mounted typically parallel to the local gravitational lines. Care must also be taken during design of embodiments of invention 10 to ensure that elements of invention 10 that are supported by swivel 34 are reasonably well balanced in a forward and aft direction to minimize any self-guidance error into the oncoming wind should riser 42 not be mounted exactly parallel to the local gravitational lines. Foundation 44 supporting riser 42 and other elements of invention 10 should as well be designed to accommodate the highest forces of wind anticipated for the region of installation. FIG. 7A and FIG. 7B as well indicate, by the use of arrows, the action of downwind guidance 30 around a common axis defined by swivel 34.

The illustrations as well help to clarify the benefit of minimizing the diameter of the inlet to turbine shroud 14 and the diameter of impellor 16 relative to the large diameters of concentrator wings 12. The larger diameter concentrator wings 12 allow invention 10 to capture and extract energy from a large area of wind relative to the frontal area of turbine shroud 14, and at the same time present a highly noticeable object to birds in flight. Concentrator wings 12 may also be made more noticeable by application of contrasting colors, shades or patterns made on these elements for installations of embodiments of invention 10 within relatively featureless landscapes as are found within prairies or deserts. The use of markings and colorings may also improve the blending of embodiments of invention 10 within other highly textured natural landscapes without creating a hazard for birds in flight. For example, considering a wind farm having embodiments of invention 10 that have varied textures and colorings similar to those of the surrounding forest, the wind turbines would appear to birds as a raised section or hill having the same textures as trees of the surrounding forest, and at the same time allow the wind turbines to visually blend into the forest landscape. The smaller diameters of turbine shroud 14 easily lend to the screening over of the inlet to this element should this be proven necessary. In all likelihood however, this will not be necessary for the aforementioned reasons.

In general, wind turbines having large rotor blade diameters of 80 meters or longer are unable to extract additional energy from winds exceeding 25 or 30 mph. In other words, the same amount of energy will be extracted from a wind of 25 mph as will be from a wind of 35 mph. This is a significant loss of potential energy given that power available in a wind increases to the cubic power of the wind velocity. These machines as well must be entirely shut down, rotor blades brought to a complete stop, at wind speeds about 45 to 50 mph. In winds generally greater than 25 mph, the long rotor blades of popular wind turbine designs develop tremendous forces that act on the blades themselves and upon the transmissions, bearings, braking systems and support structures of these machines. This is an important consequence when considering that the available power in a 35 mph wind approaches three times (2.74) the power available in a 25 mph wind, the top of the power generation curve for typical large rotor blade diameter wind turbines. Invention 10, because of flow regulator 18 is able to present a large frontal area to the oncoming wind while at once minimizing the size of rotor blades or impellor 16. By using smaller diameter rotor blades, embodiments of invention 10 are able to run impellor 16 at substantially higher rpm's and efficiently extract energy from significantly higher wind speeds as compared with popular wind turbines having large diameter rotor blades. As previously stated, shrouded wind turbines that do not include flow regulator 18 are not able to process these higher speed winds or even to provide a higher ratio of shroud diameter to impellor diameter without experiencing the stalling of the shrouds as described.

Finally, due to the overall design of invention 10, and in particular to the introduction of aerobrake 20 and downwind guidance 30, and the relatively smaller impellor 16 and turbine shroud 14, design, production and maintenance costs and expenses may all be reduced relative to current wind turbine designs.

The terms of 'air' and 'wind' are used throughout this application to denote a fluid as it is understood and defined in the art and practice of fluid dynamics. Although the primary intent of invention 10 is for the extraction of energy from wind, the principles and innovations may apply equally to the flow of other fluids, and in particular to flowing water, also considered abundant sources of naturally renewing energy.

The preceding descriptions serve to explain the main objects and advantages of invention 10. The scope of the invention should not be determined by the embodiments as described or illustrated, but by the appended claims and their legal equivalents.

What is claimed is:

1. A wind energy extraction device, comprising:
    an impeller and associated power converter for the impellor;
    concentrator wings disposed about the impellor, the concentrator wings being spaced apart to permit air flow between the concentrator wings;
    the impellor being positioned in relation to the concentrator wings to be driven in use by a flow of wind induced by the air flow between the concentrator wings; and
    a flow regulator positioned downstream of the impellor, the flow regulator having wind deflecting aerodynamic surfaces that are contoured to enhance laminar flow of the air flow between the concentrator wings.

2. The wind energy extraction device of claim 1 in which the impellor is disposed within a turbine shroud.

3. The wind energy extraction device of claim 1 in which the concentrator wings are concentrically disposed to each other about a central axis.

4. The wind energy extraction device of claim 3 in which the impellor is located on the central axis.

5. The wind energy extraction device of claim 2 further comprising an aerobrake arranged such that the proximity of the turbine shroud to the flow regulator may be adjusted depending on wind conditions.

6. The wind energy extraction device of claim 5 wherein the power converter is installed on the downwind side of the aerodynamic surfaces of the flow regulator; and further comprising an impellor driveshaft connecting the impellor to the power converter, the impellor driveshaft extending out of the flow regulator and positioning the impellor within the flow of wind passing through the turbine shroud.

7. The wind energy extraction device of claim 6 further comprising a downwind guide for supporting a plurality of elements, the downwind guide presenting little obstruction to the higher speed wind flow upstream of the plurality of elements, the downwind guide facilitating orientation of the plurality of elements approximately into the oncoming wind and the downwind guide comprising a lee support that supports the plurality of elements and extends in a downwind direction then turns outward from a central axis and connects with a swivel that allows the plurality of elements to rotate around a common axis and effect the orientation.

8. The wind energy extraction device of claim 2 further wherein the power converter is installed on the downwind side of the aerodynamic surfaces of the flow regulator; and further comprising an impellor driveshaft connecting the impellor to the power converter, the impellor driveshaft extending out of the flow regulator and positioning the impellor within the flow of wind passing through the turbine shroud.

9. The wind energy extraction device of claim 8 further comprising a downwind guide for supporting a plurality of elements, the downwind guide presenting little obstruction to the higher speed wind flow upstream of the plurality of elements, the downwind guide facilitating orientation of the plurality of elements approximately into the oncoming wind and the downwind guide comprising a lee support that supports the plurality of elements and extends in a downwind direction then turns outward from a central axis and connects with a swivel that allows the plurality of elements to rotate around a common axis and effect the orientation.

10. The wind energy extraction device of claim 1 further comprising a downwind guide for supporting a plurality of elements, the downwind guide presenting little obstruction to the higher speed wind flow upstream of the plurality of elements, the downwind guide facilitating orientation of the plurality of elements approximately into the oncoming wind and the downwind guide comprising a lee support that supports the plurality of elements and extends in a downwind direction then turns outward from a central axis and connects with a swivel that allows the plurality of elements to rotate around a common axis and effect the orientation.

11. A method for extracting energy from wind, the method comprising the steps of:
    driving an impellor using a flow of wind induced by air flow between concentrator wings, the impellor being connected to a power converter; and
    deflecting the flow of wind using aerodynamic surfaces of a flow regulator to enhance laminar flow of the air flow between the concentrator wings and thereby reduce aerodynamic stalling of one or more of the concentrator wings.

12. The method of claim 11 in which the impellor is disposed within a turbine shroud.

13. The method of claim 12 further comprising adjusting the proximity of the turbine shroud to the flow regulator according to wind conditions.

14. The method of claim 13 in which adjusting the proximity of the turbine shroud to the flow regulator comprises reducing the proximity in high wind conditions to impede or restrict the the flow of wind through turbine shroud.

15. The method of claim 14 in which the power converter is located coaxially with the impellor and downwind of the flow regulator.

16. The method of claim 11 further comprising the concentrator wings being pivotally mounted to allow the concentrator wings to align with wind direction.

17. The method of claim 16 in which the concentrator wings are pivotally mounted on a swivel connected to the concentrator wings by a lee support.

18. The method of claim 11 in which the power converter is located coaxially with the impellor and downwind of the flow regulator.

* * * * *